US010044841B2

(12) United States Patent
Sung et al.

(10) Patent No.: US 10,044,841 B2
(45) Date of Patent: *Aug. 7, 2018

(54) METHODS AND SYSTEMS FOR CREATING PROTOCOL HEADER FOR EMBEDDED LAYER TWO PACKETS

(71) Applicant: Pismo Labs Technology Limited, Hong Kong (HK)

(72) Inventors: Patrick Ho Wai Sung, Hong Kong (HK); Alex Wing Hong Chan, Hong Kong (HK); Kam Chiu Ng, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 170 days.

This patent is subject to a terminal disclaimer.

(21) Appl. No.: 15/180,637

(22) Filed: Jun. 13, 2016

(65) Prior Publication Data

US 2017/0359448 A1    Dec. 14, 2017

Related U.S. Application Data

(63) Continuation of application No. 13/881,727, filed as application No. PCT/IB2011/055042 on Nov. 11, 2011, now Pat. No. 9,369,550.

(51) Int. Cl.
*H04L 29/06* (2006.01)
*H04L 12/46* (2006.01)

(52) U.S. Cl.
CPC .......... *H04L 69/22* (2013.01); *H04L 12/4633* (2013.01); *H04L 63/0272* (2013.01); *H04L 63/0428* (2013.01); *H04L 69/12* (2013.01)

(58) Field of Classification Search
None
See application file for complete search history.

(56) References Cited

U.S. PATENT DOCUMENTS 6,732,314 B1    5/2004  Borella et al.
7,139,271 B1 *  11/2006 Parruck ............... H04L 12/5601
                                                370/392

(Continued)

FOREIGN PATENT DOCUMENTS

| CN | 1468007   A  | 1/2004  |
| CN | 101288272 A  | 10/2008 |
| CN | 102123002 A  | 7/2011  |

OTHER PUBLICATIONS

First Office Action of Chinese Application No. 201180074664.7, dated Jul. 7, 2016.

(Continued)

*Primary Examiner* — Brandon M Renner
(74) *Attorney, Agent, or Firm* — Hershkovitz & Associates, PLLC; Abe Hershkovitz

(57) ABSTRACT

Methods and systems for creating protocol header to allow network device to transfer and receive layer two packets through multiple network links. One or more layer three packets are used to encapsulate layer two packets. The protocol header includes a network link identification and a tunnel sequence number. The network link identification is used to identify the network link and the tunnel sequence number is used to identify the sequence of the one or more layer three packets in a network link. A layer two packet may be encrypted first before being embedded in the one or more layer three packets.

20 Claims, 6 Drawing Sheets

(56) References Cited

U.S. PATENT DOCUMENTS

| | | | |
|---|---|---|---|
| 7,237,260 B2 | 6/2007 | Yu et al. | |
| 8,146,148 B2 | 3/2012 | Cheriton | |
| 2002/0188839 A1* | 12/2002 | Noehring | H04L 29/06 |
| | | | 713/153 |
| 2003/0110294 A1* | 6/2003 | Luo | H04L 29/06 |
| | | | 709/245 |
| 2007/0283429 A1 | 12/2007 | Chen et al. | |
| 2008/0062926 A1 | 3/2008 | Oba | |
| 2008/0198828 A1 | 8/2008 | Reznik et al. | |
| 2008/0198858 A1* | 8/2008 | Townsley | H04L 12/4641 |
| | | | 370/401 |
| 2008/0285452 A1 | 11/2008 | Oran | |
| 2008/0285463 A1* | 11/2008 | Oran | H04L 65/80 |
| | | | 370/241 |
| 2010/0290485 A1* | 11/2010 | Martini | H04L 12/4641 |
| | | | 370/477 |
| 2011/0078783 A1* | 3/2011 | Duan | H04L 12/4633 |
| | | | 726/15 |
| 2011/0078784 A1* | 3/2011 | Ohtani | H04L 63/0272 |
| | | | 726/15 |
| 2014/0294018 A1* | 10/2014 | Sung | H04L 63/0272 |
| | | | 370/474 |

OTHER PUBLICATIONS

Second Office Action of Chinese Application No. 201180074664.7, dated Apr. 5, 2017.
International Search Report of International Application No. PCT/IB2011/055042, dated Aug. 30, 2012.
Written Opinion of the international Searching Authority in International Application No. PCT/IB2011/055042, dated Aug. 30, 2012.

* cited by examiner

[Fig. 1]
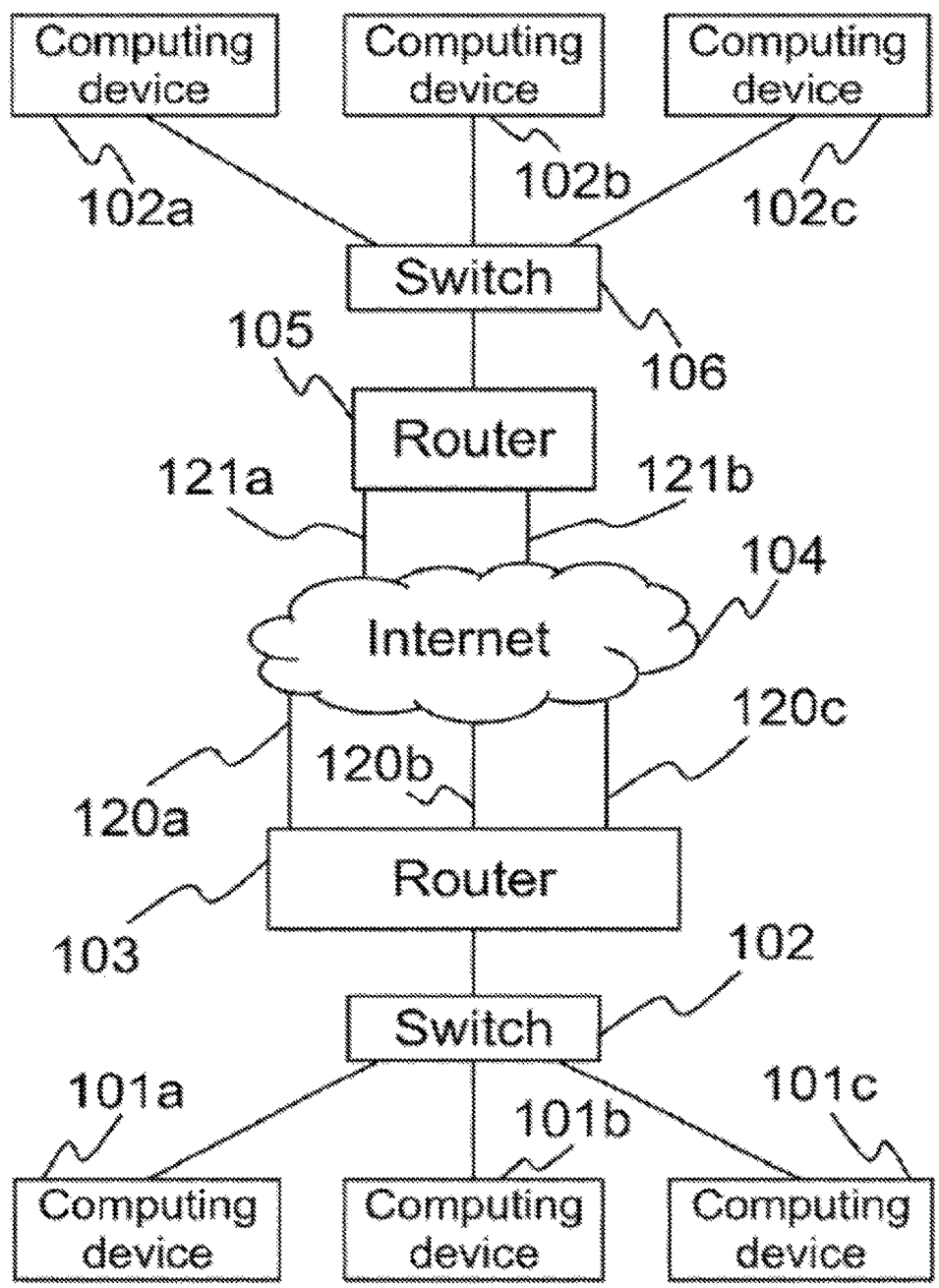

[Fig. 2]
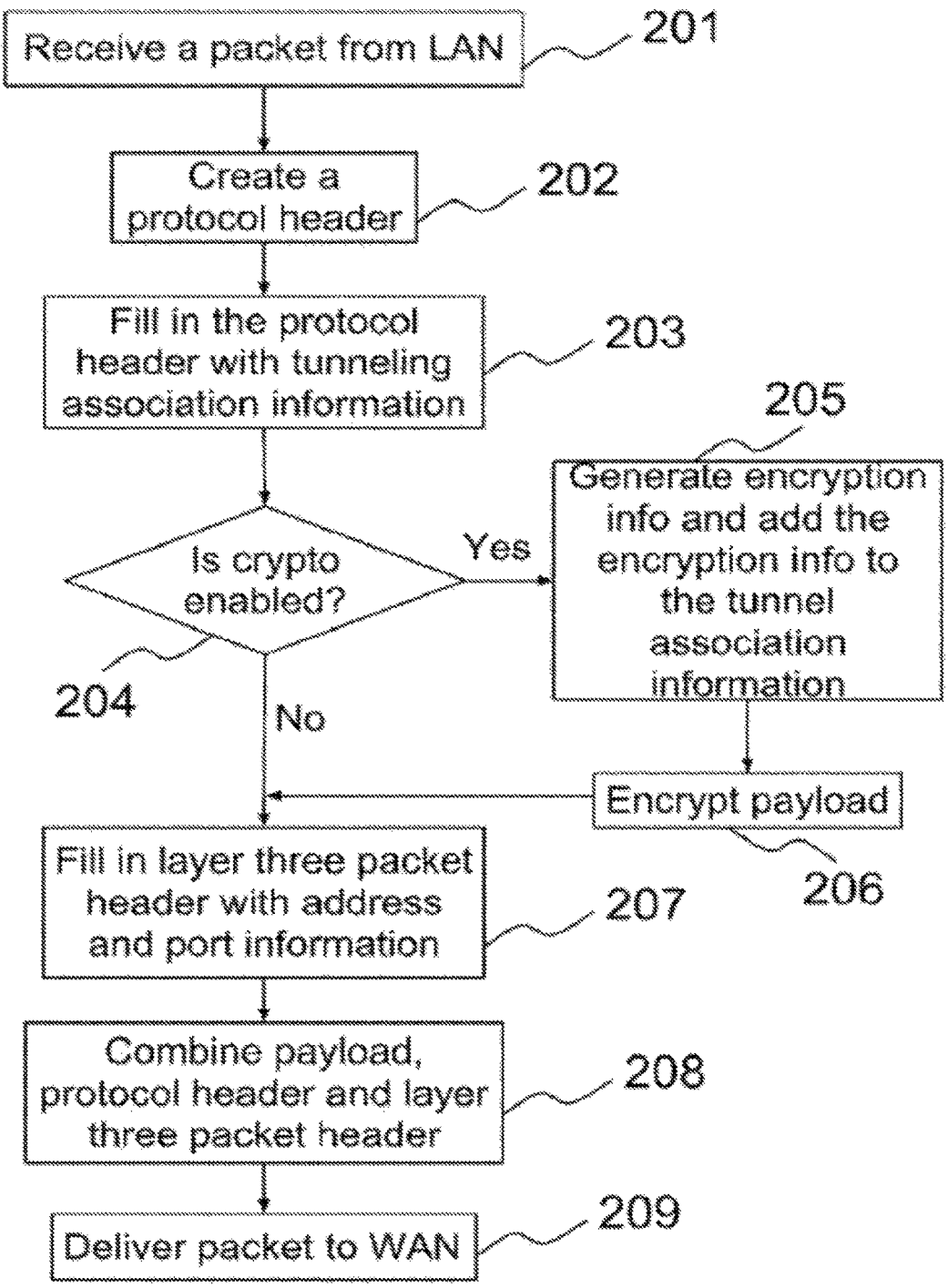

[Fig. 3]
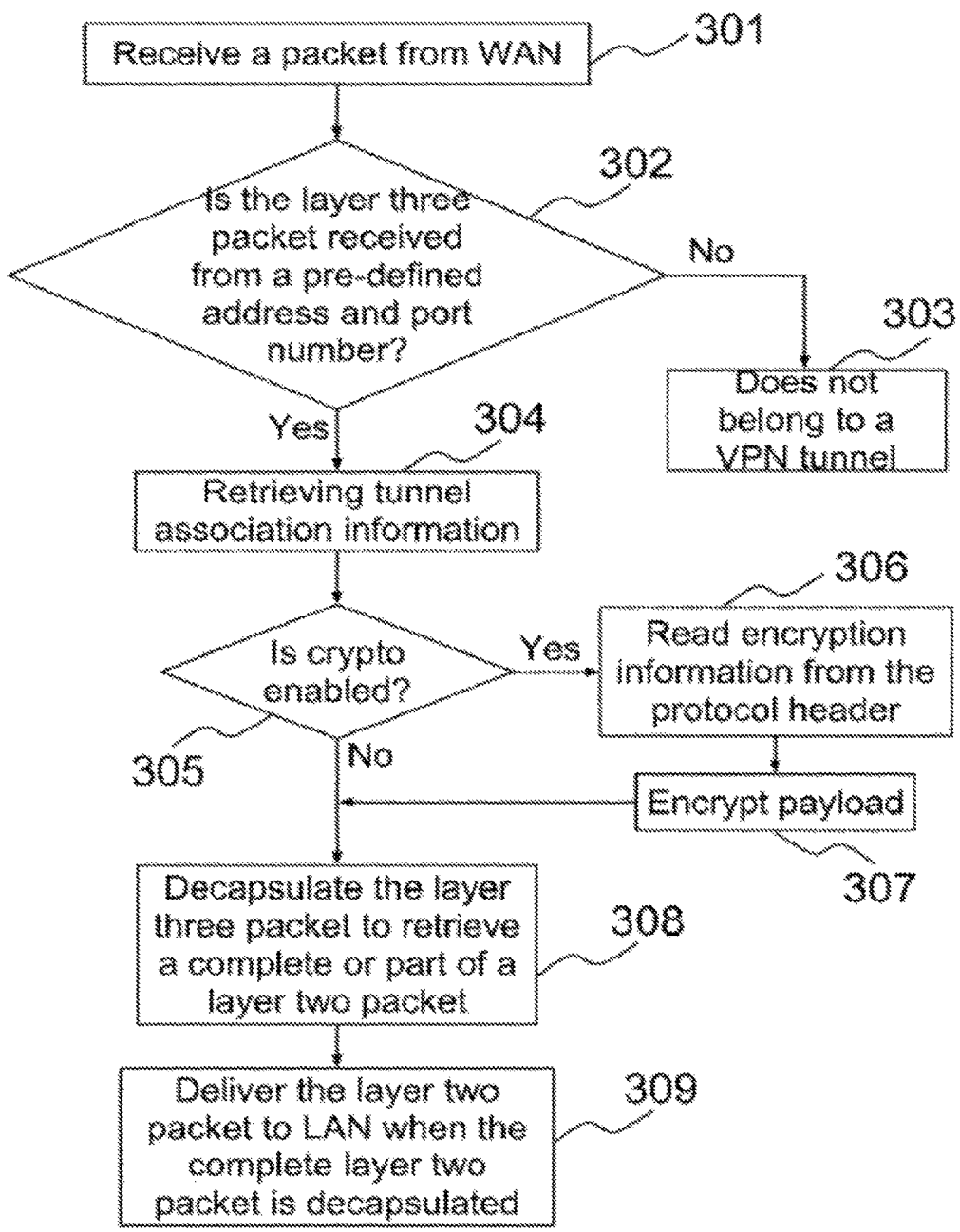

[Fig. 4]
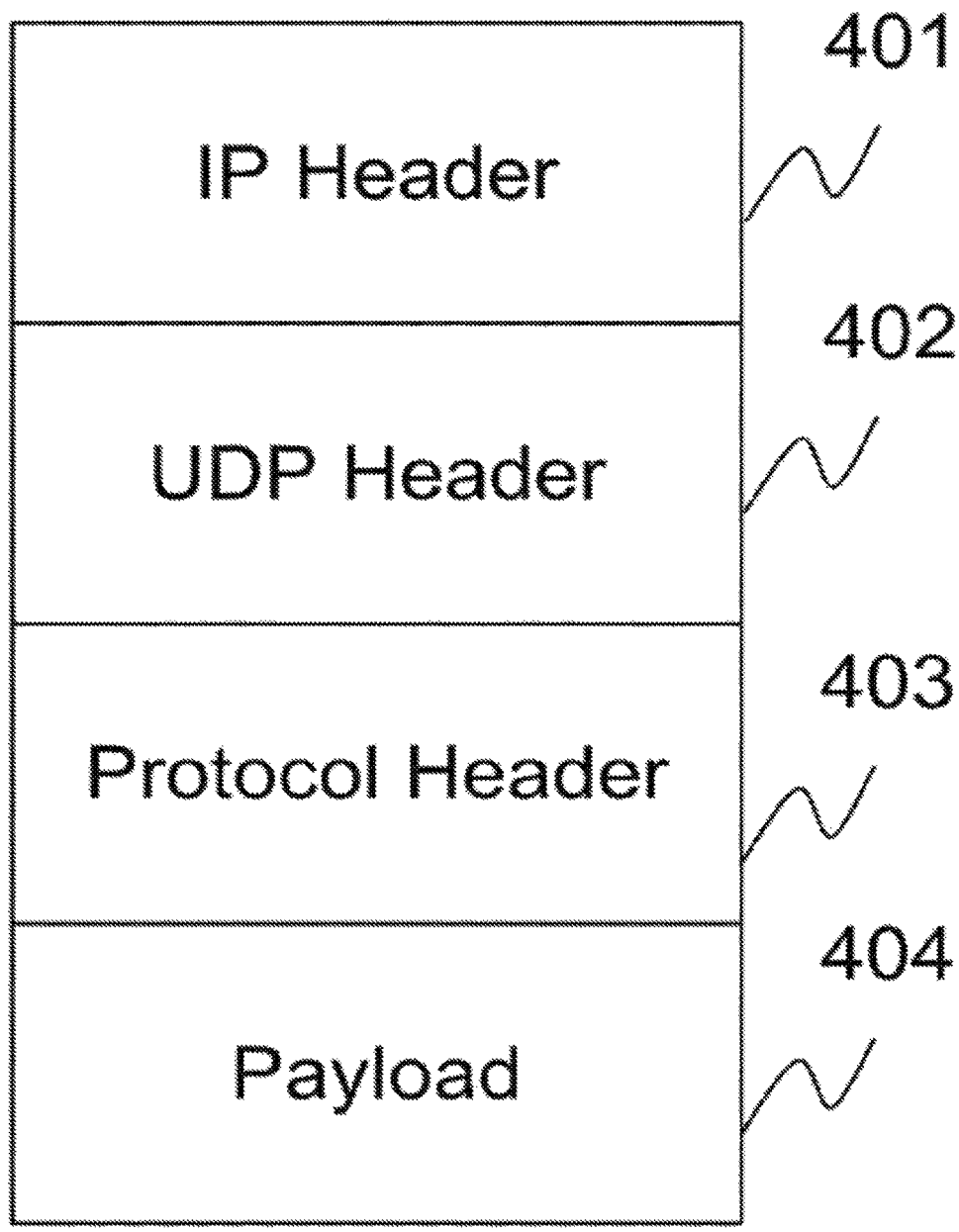

[Fig. 5]
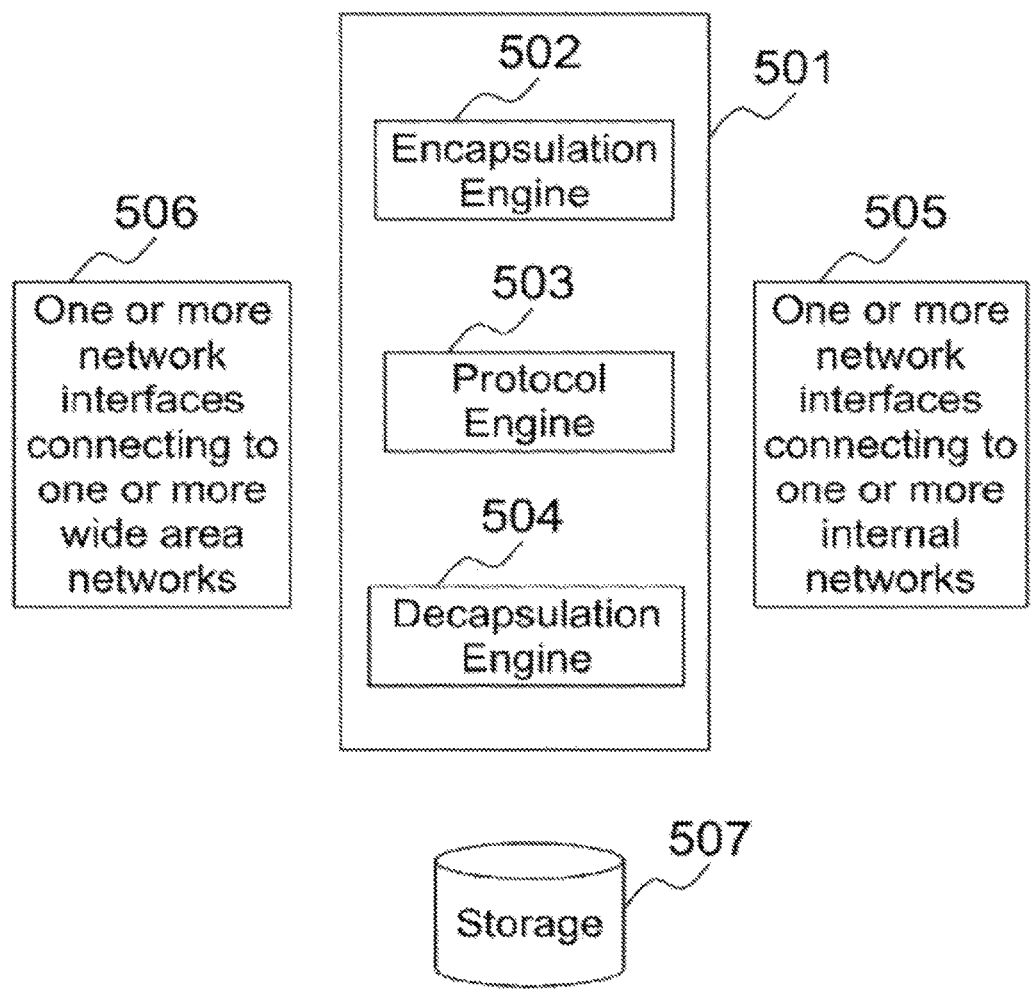

[Fig. 6]
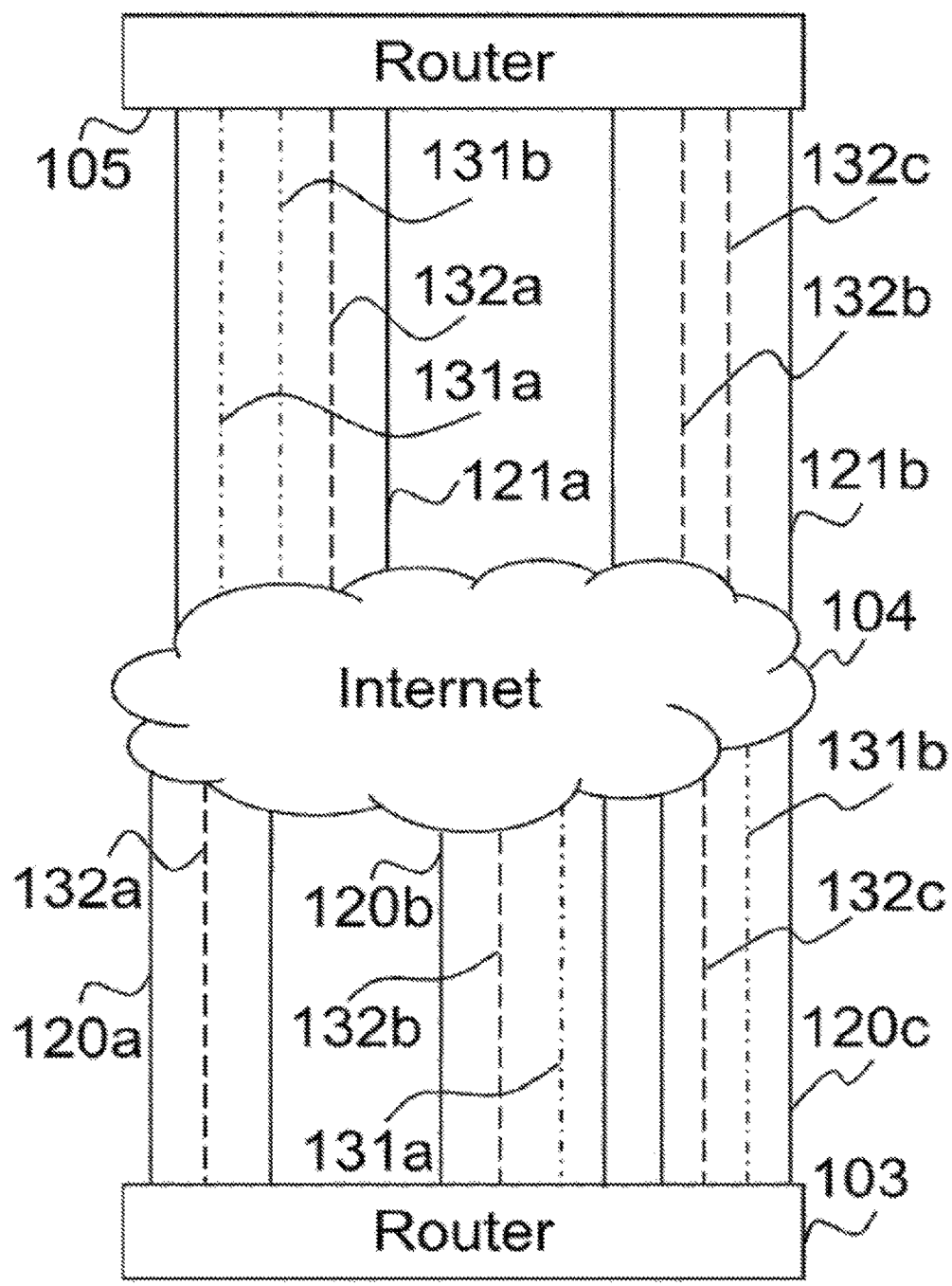

METHODS AND SYSTEMS FOR CREATING PROTOCOL HEADER FOR EMBEDDED LAYER TWO PACKETS

RELATED APPLICATIONS

The present application is a Non-provisional continuation application which claims the benefits of and is based on U.S. application Ser. No. 13/881,727 titled "PROTOCOL FOR LAYER TWO MULTIPLE NETWORK LINKS TUNNELLING" filed on 12 Jul. 2013. The contents of the above-referenced application are herein incorporated by reference.

TECHNICAL FIELD

The present invention relates to the field of data communications. More particularly, the present invention relates to methods and systems for creating protocol header to allow multiple network links to tunnel layer two data.

BACKGROUND

Layer 2 tunnelling establishes a tunnelling network between multiple distant networks to create a virtual private network (VPN). Layer 2 tunnel creation can be either manually by entering correct command to setup the tunnel interfaces, or automatically by having a service in network devices to negotiate the correct tunnel interfaces.

Layer 2 Tunnelling Protocol (L2TP), a standard published by Internet Engineering Task Force, is a tunnelling protocol used to support layer 2 virtual private networks (VPNs). It does not provide any encryption or confidentiality by itself; it relies on an encryption protocol that it passes within the tunnel to provide privacy. IPsec is often used to secure L2TP packets by providing confidentiality, authentication and integrity. The combination of these two protocols is generally known as L2TP/IPsec.

The problem of implementing L2TP is performance because of the number of bytes remaining available for payload is reduced. Under L2TP/IPsec, the number of bytes remaining available for payload is further reduced because of multiple levels of encapsulations. In addition, IPsec is relatively complicated to setup and maintain. The implementation of L2TP or L2TP/IPsec over bonded networks, which two or more logical or physical network connections are combined, further reduces the number of bytes remaining available for payload and increases complexity of setting and maintenance.

ADVANTAGEOUS EFFECTS

The present invention allows the use of tunnel association information, which contains a network link identification (NLID) and a tunnel sequence number (TSN), in a layer 3 packet to provide layer 2 tunnels over layer 3 networks while improving performance and reducing complexity comparing to other layer 2 tunnelling methods and systems.

SUMMARY OF THE INVENTION

To address the problems described above, the present invention discloses methods and a system using tunnel association information to solve the problems. According to embodiments of the present invention, network devices use tunnel association information when encapsulating layer 2 packets in layer 3 packets. Tunnel association information is also used by network devices when decapsulating layer 2 packets from received layer 3 packets. The use of tunnel association information allows the layer 3 packets be transmitted and received through different network links, which belong to the same VPN. Therefore, the layer 3 packets may have different source address and destination addresses and results in higher throughout and reliability. Tunnel association information is stored in a protocol header. Tunnel association information includes a network link identification and a tunnel sequence number. Network link identification is used to identify the network link and virtual private tunnel the layer three packets belonging to. Tunnel sequence number is used to identify the sequence of said one or more layer three packets in a network link.

A system comprising of processing engine, network interfaces, encapsulation engine, decapsulation engine, protocol engine and storage system is disclosed to solve the problems. The processing engine is consisted of the encapsulation engine, decapsulation engine and processing engine. The encapsulation engine is used to encapsulate a received layer two packet in one or more to be delivered layer three packets. The decapsulation engine is used to decapsulate a layer 3 packet into a part or a complete layer 2 packet and retrieves the protocol header from the layer 3 packet. The encryption engine is used to encrypt and decrypt layer 2 packets and layer 3 packet. The protocol engine is used to create and retrieve protocol header, which contains tunnel association information. The storage system is used to provide instructions to processing engine and to provide temporary storage.

BRIEF DESCRIPTION OF DIAGRAMS

The accompanying drawings, which are incorporated in and constitute a part of this specification, illustrate embodiments of the invention and, together with the description, explain the invention. In the drawings, wherein:

FIG. 1 is a network diagram illustrating a network environment in which network devices employ an exemplary method of layer 2 virtual private network tunnelling;

FIG. 2 is a flow chart illustrating an exemplary method in which a network device employs layer 2 virtual private network tunnelling when sending a layer 2 packet;

FIG. 3 is a flow chart illustrating an exemplary method in which a network device employs layer 2 virtual private network tunnelling when receiving a layer 3 packet;

FIG. 4 is an exemplary Internet Protocol packet format of present invention;

FIG. 5 is a block diagram illustrating an exemplary system in which a network device employs layer 2 virtual private network tunnelling;

FIG. 6 is a block diagram illustrating the relationship between network connections, network links and virtual private network tunnel.

MODE(S) FOR CARRYING OUT THE INVENTION

Detailed Descriptions

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

FIG. 1 illustrates a network environment of how two distant layer 2 networks can be connected together through layer 3 networks by implementing an embodiment of the present invention. The same network environment can be employed to connect three or more distant layer 2 networks through layer 3 networks. Layer 2 network protocol that can be employed in the present invention includes Ethernet, Token Ring, Frame Relay, PPP, X.25 and ATM. Layer 3 network protocol can be employed in the present invention includes Internet Protocol (IP) version 4, IPv6, Internetwork Packet Exchange, and AppleTalk.

Computing devices 101a, 101b and 101c are connected to switch 102 and are in the same layer 2 network, such that they can communicate to each other through a layer 2 communication protocol. Computing devices 102a, 102b and 102c are connected to switch 106 and are in the same layer 2 network, such that they can also communicate to each other through a layer 2 communication protocol. However any of computing devices 101a, 101b and 101 c cannot directly communicate with any of computing devices 102a, 102b and 102c through a layer 2 communication protocol even computing devices 101a, 101b, 101c, 102a, 102b and 102c all use the same layer 2 communication protocol, such as Ethernet. This is because switch 102 and switch 103 are separated by Internet 104. In order to allow computing devices 101a, 101b, and 101c to perceive computing devices 102a, 102b and 102c are in the same network, a virtual private network (VPN) has to be established among computing devices 101a, 101b, 101c, 102a, 102b and 102c. Router 103 and router 105 together establish a VPN tunnel through Internet 104 between switch 102 and switch 106.

Router 103 routes a layer 2 packets from switch 102 to router 105 through Internet 104 through a VPN by first encapsulating the layer 2 packet into one or more layer 3 packets, then delivering the one or more layer 3 packets through either one or more of network connections 120a, 120b and 120c. Network connections 120a, 120b, and 120c connected are connected to router 103 through three network interfaces respectively and can be implemented using optical fiber, Ethernet, ATM, Frame Relay, T1/E1, IPv4, IPv6, wireless technologies, Wi-Fi, WiMax, High-Speed Packet Access technology, and 3GPP Long Term Evolution (LTE). Therefore the one or more layer 3 packets, which may carry different parts of the layer 2 packet, may have different layer 3 source and destination addresses. If multiple layer 3 packets are used to encapsulate one layer 2 packet, the layer 2 packet is fragmented into multiple layer 3 packets. Network connections 120a, 120b and 120c can be provided by the same or different network service providers to connect router 103 to Internet 104.

Similarly, network connections 121a and 121b are connected to router 105 two network interfaces respectively and can be implemented using optical fiber, Ethernet, ATM, Frame Relay, T1/E1, IPv4, IPv6, wireless technologies, Wi-Fi, WiMax, High-Speed Packet Access technology, and 3GPP Long Term Evolution (LTE). Network connections 121a and 121b can be provided by the same or different network service providers to connect router 105 to Internet 104.

A network connection, such as a LTE connection deployed by an antenna network interface of router 103, can contain one or more network links. Packets belonging to the same VPN can be carried by one or more network connections. Packets belonging to the same VPN can also be carried by one or more network links. A network connection can carry multiple VPN tunnels. However, a network link can only carry packets belonging to one VPN tunnel. A network link can be use connection-oriented protocol, such as TCP, or a connectionless protocol, such as UDP.

FIG. 6 illustrates the relationship between network connection, network link and VPN tunnel established in logical network 120a, 120b, 120c, 121a and 121b. For example, there are two VPNs, VPNa and VPNb, established between router 105 and router 103. VPNa is implemented by using two network links, network link 131a and 131b. Network link 131a carries packets belonging to VPNa using the source layer 3 address of network connection 121a and the destination layer 3 address of network connection 120b. Network link 131b also carries packets belonging to VPNa, but using the source layer 3 address of network connection 121a and the destination layer 3 address of network connection 120c. For example, when a layer 2 packet is delivered through VPNa from router 105 to router 103, it can be fragmented into two layer 3 packets, which may have same source layer 3 address and different destination layer 3 addresses.

VPNb is implemented by using three network links, network link 132a, 132b and 132c. Network link 132a carries packets belonging to VPNb using the source layer 3 address of network connection 121a and the destination layer 3 address of network connection 120a. Network link 132b also carries packets belonging to VPNb, but using the source layer 3 address of network connection 121b and the destination layer 3 address of network connection 120b. Network link 132c also carries packets belonging to VPNb, but using the source layer 3 address of network connection 121b and the destination layer 3 address of network connection 120c. When multiple layer 2 packets are delivered through VPNb from router 105 to router 103, they can be carried by different network links and therefore the layer 3 packets encapsulating the layer 2 packets may have different source layer 3 addresses and different destination layer 3 addresses.

The reason why layer 3 packets with different source layer 3 addresses and different destination layer 3 addresses can encapsulate layer 2 packet payload that belong to the same tunnel is because of the utilization of tunnel association information inside the layer 3 packets.

Tunnel association information is represented by a series of bits and contained in the protocol header. The protocol header is composed of a series of bits. The number of bits representing protocol header varies depending on the nature of information and amount of information to be put in a VPN tunnel. According to one of the embodiments of the present invention, the tunnel association information can be encrypted for security purpose. According to one of the embodiments of the present invention, a tunnel association includes a network link identification (NLID) and a tunnel sequence number (TSN). The NLID is used to identify the network link a layer 3 packet belonging to. A network link is a link established between two network nodes using a logical network.

As it is possible that there are multiple network links implemented between two network devices using the same pair of layer 3 source address and destination address, the number of bits representing NLID should be long enough to avoid confusion of the identities of network links. In addition, the NLID is used to allow receiving router to recognize that the received layer 3 packet belongs to a particular VPN tunnel, instead of other network traffic. TSN is used to assist the receiving router, such as router 105, to re-order received layer 3 packets belonging to a network link in a correct sequence. TSN is assigned by router 103. According to one embodiment of the present invention, each TSN should be unique during the lifetime of a network link. According to one embodiment of the present invention, a TSN can be reused again when the lifetime of a network link is beyond a time period. The number of bits representing TSN should be long enough to avoid confusion of packet sequence. According to one embodiment of the present invention, the number of bits use to represent NLID is 32 bits. According to one embodiment of the present invention, the number of bits use to represent TSN is 32 bits also.

According to one of the embodiments of the present invention, NLID is unique to a source address, destination address or to a pair of source address and destination address. Therefore the same TSN may be reused for different source address, destination address, or a pair of source and destination address. According to one of the embodiments of the present invention, a port number is also part of a NLID.

Internet 104 is comprised of one or more systems of interconnected computer networks running layer 3 protocols. A system of interconnected computer network of Internet 104 can be a private or public computer network. When router 105 receives the one or more layer 3 packets through either one of or both network connections 121*a* and 121 from Internet 104, it converts the one or more layer 3 packets back to the layer 2 packet and then delivers the layer 2 packet to switch 106. Using the same VPN tunnel, layer 2 packets from switch 106 can also be sent to switch 102. Therefore, computing devices 101*a*, 101*b*, and 101*c* and computing devices 102*a*, 102*b* and 102*c* are in the same VPN and able to communicate with each other using the same layer 2 network protocol.

According to one of the embodiments of the present invention, the number of network connection between router 103 and Internet 104 is at least one. According to one embodiment of the present invention, the number of network connection between Internet 104 and router 105 is at least one. When there is only one network connection between router 103 and Internet 104 as well as one network connection between Internet 104 and router 106, all layer 3 packets belonging to a VPN tunnel have to pass through the same network connection between router 103 and Internet 104 as well also pass through the same network connection between router 105 and Internet 104. In this circumstance, the benefits of performance gain, higher redundancy and increased bandwidth provided by the present invention is not significant comparing to L2TP.

Method

FIG. 2 is a flow chart illustrating one of the embodiments of the present invention by using tunnel association to encapsulate layer 2 packets in layer 3 packets. When router 103 receives a layer 2 packet at step 201, router 103 encapsulates the layer 2 packet into one or more layer 3 packets by first creating a protocol header at step 202. The protocol header is then filled by router 103 at step 203 with tunnelling association information. Tunnel association information is used to allow router 103 to communicate with router 105 in order to associate a layer 3 packet with a VPN tunnel.

According to one of the embodiments of the present invention, router 103 encrypts layer 2 packet. At step 204, router 103 decides whether the layer 2 packet has to be encrypted by following pre-defined rules set manually or negotiated between network devices. If it is decided the layer 2 packet has to be encrypted, encryption information will be added to the protocol header at step 205. Encryption information include cipher information and seed value information. According to one of the embodiments of the present invention, the encryption is conducted by using Advanced Encryption Standard and the associated initialization vector is considered as encryption information and added to tunnel association information and stored in the protocol header. At step 206, according to one embodiment, the complete layer 2 packet is encrypted. According to another embodiment, the protocol header is also encrypted. When the protocol header is encrypted, encryption information stored in the protocol header is not encrypted in order to facilitate the decryption process at the receiving network device. The ordering of step 205 and step 206 can be swapped. According to one of the embodiments of the present invention, router 103 does not encrypt layer 2 packets and therefore steps 204, 205 and 206 do not exist.

At step 207, a layer 3 packet header information is created. The layer 3 packet header is filled with the source address, destination address and port information of router 103. However, when router 103 has more than one network connections, router 103 may have more than one layer 3 source address and/or more than one layer 3 destination address. When layer 3 packets are delivered to Internet 104 by more than one network connections, the source addresses and destination addresses of layer 3 packets belonging to the same VPN tunnel can be different from each other. For example, at the network illustrated in FIG. 1, three layer 2 packets received by router 103 from switch 102 are encapsulated by three different layer 3 packets. The first layer 3 packet is sent by router 103 using network 120*a* to network connection 121*a*, therefore, the source address and destination address of the first layer 3 packet is the address of network connection 120*a* and network connection 121*a* respectively. The second layer 3 packet is sent by router 103 using network 120*a* to network connection 121*b*, therefore, the source address and destination address of the second layer 3 packet is the address of network connections 120*a* and network 121*b* respectively. The third layer 3 packet is sent by router 103 using network connection 120*c* to network connection 121*b*, therefore, the source address and destination address of the second layer 3 packet is the address of network connection 120*c* and network 121*b* respectively. Router 103 determines which network connection to use depends on many decision factors, such as network latency and network bandwidth, which are apparent to a skilled person in the art to choose and implement.

At step 208, router 103 combines the payload, which is the original layer 2 packet received from switch 102 at step 201, protocol header and layer 3 packet header are combined together to form one or more layer 3 packets. At step 209, router 103 delivers the one or more layer 3 packet to Internet 104. When one layer 3 packet is not large enough to encapsulate the protocol header and complete layer 2 packet together, the layer 2 packet can be fragmented and be encapsulated into multiple layer 3 packets. The fragmentation can be done by relying on layer 3 fragmentation, such that the protocol header and the layer 2 packet are together considered as one payload and fragmented according to the layer 3 protocol used. Therefore, the first layer 3 packet contains the complete protocol header and part of the layer 2 packets, and subsequent layer 3 packets do not contain the protocol header. On the other hand, the fragmentation can be done by relying on the network link protocol, such that each layer 3 packet contains a complete protocol header and part of the layer 2 packet.

According to one of the embodiments of the present invention, the layer 3 packet header contains information used for routing, including information for data link layer, network layer and transport layer of OSI model.

FIG. 4 illustrate one embodiment of a layer 3 packet used to carry a VPN tunnel deployed with the present invention. The layer 3 packet is an IP packet composed of IP Header 401, UDP Header 402, protocol header 403 and payload 404. IP Header 401 is comprised of a series of bits and is the header of IPv4 described in RFC 791 published by Internet Engineering Task Force (IETF) or IPv6 described in RFC 2460 also published by IETF. UDP Header is comprised of a series of bits and carries information of user data protocol described in RFC 768 published by IETF. Protocol header 403 is comprised of a series of bits and contains tunnel association information which is described in the present invention. Payload 404 is comprised a series of bits and carry a complete or a part of a layer 2 packet.

The procedure and corresponding information required to establish a VPN tunnel before layer 3 packets can use the VPN tunnel to encapsulate layer 2 packets include access apparent to a skilled person in the art. The corresponding information can be inputted by network device administrators and/or can be exchanged between the network devices. It is also apparent to a skilled person in the art how to exchange the VPN tunnel establishment information.

The number of layer 3 packets used to encapsulate the layer 2 packet depends on many factors, including packet size of the layer 2 packet, the payload size of the layer 3 packets, the conventional allowed size of layer 3 packets in Internet 104, user policy, standards and other factors. It is apparent to a skilled person in the art how to determine the number of layer 3 packets to be used for the encapsulation.

NLID and TSN can be set to be zero when a layer 2 packet is sent through a network link to check the health status of the network link, the health status of the VPN tunnel or to carry non-payload information. Other than those, the value of NLID and TSN are non-zero because NLID and TSN are used to identify the network link and packet sequence.

According to one of the embodiments of the present invention, the tunnel association information further includes a global sequence number (GSN), which is used for arranging packet received of a VPN tunnel to a correct sequence by a receiving network device. According to one embodiment of the present invention, each GSN should be unique during the lifetime of a VPN tunnel. According to one embodiment of the present invention, a GSN can be reused again when the lifetime of a network link is beyond a time period. The number of bits representing GSN should be long enough to avoid confusion of packet sequence. According to one embodiment of the present invention, the number of bits use to represent GSN is 32 bits.

According to one of the embodiments of the present invention, the tunnel association information further includes a layer 2 tunnelling indicator which is used to inform the receiving network device that the layer 3 packet contains content for layer 2 tunnelling. The layer 2 tunnelling indicator can be embedded by using one or more bits in the protocol headers.

According to one of the embodiments of the present invention, the tunnel association information further includes a data offset indicator, which indicates the number of offsets between User UDP and the protocol header. Data offset indicator can be embedded by using one or more bits in the protocol headers.

According to one of the embodiments of the present invention, the tunnel association information further includes a version indicator, which specifies version of the VPN tunnel protocol being used and allow backward and forward compatibility. Version indicator can be embedded by using one or more bits in the protocol headers.

According to one of the embodiments of the present invention, the tunnel association information further includes an optional timestamp indicator, which specifies whether timestamp information is available in the protocol header. Timestamp information can be used to calculate the time difference between the sending of the packet and the receival of the packet or to calculate round trip time between the sending of a packet and receival of the corresponding acknowledgement. Timestamp indicator and timestamp information can be embedded by using one or more bits in the protocol headers.

According to one of the embodiments of the present invention, the tunnel association information further includes an acknowledgement indicator, which specifies whether acknowledgement information is contained in the protocol header. Acknowledgement information is used to keep count of the packets that have been successfully received. Acknowledgement indicator and acknowledgement information can be embedded by using one or more bits in the protocol headers. According to one of the embodiments of the present invention, acknowledgement information to indicate the highest sequence number, such as TSN, of packets that have been received.

According to one of the embodiments of the present invention, the tunnel association information further includes an alternative acknowledgement indicator, which specifies whether alternative acknowledgement information is contained in the protocol header. Alternative acknowledgement information is used to keep count of the number of packets that have been successfully received and is used to acknowledge that more than one packet is received. Alternative acknowledgement indicator and alternative acknowledgement information can be embedded by using one or more bits in the protocol headers.

According to one of the embodiments of the present invention, the number of bytes used by a protocol header is the number of bytes belonging to the header of the layer 3 packet for routing and the number of bytes belonging to the payload of the encapsulated layer 2 packet subtracting from the total number of bytes of a layer 3 packet.

FIG. 3 is a flow chart illustrating one of the embodiments of the present invention by using tunnel association to decapsulate layer 2 packets in layer 3 packets. When router 105 receives a layer 3 packet at step 301 from Internet 104, router 105 determines whether the layer 3 packet belongs to any VPN tunnel by examining the port number of the layer 3 packet. If, at step 302, the port number matches a pre-define port number, router 105 assumes that the layer 3 packet belonging to a VPN tunnel. The pre-defined port number can be pre-determined by network administrator, manufacturer of network devices or negotiated between network devices. Router 105 then identifies the protocol header at step 303. According to one implementation, the protocol header is located next to the header of the layer 3 packet.

As the protocol header containing tunnel association information, by reading NLID stored in protocol header at step 304 router 105 is able to determine which network link and VPN the layer 3 packet belongs to and determines whether the layer 3 packet contains a whole or part of a layer 2 packet. When the payload of the layer 3 packet is encrypted and router 105 first identifies encryption information from tunnel association information stored in a protocol header at step 305 determines and then decrypt the payload at step 307 with the information retrieved from the protocol header at step 306. According to one of the embodiments of the present invention, part of the payload of the layer 3 packet is encrypted, for example, header of the encapsulated layer 2 packet is not encrypted but the content of the layer 2 packet is encrypted. According to one embodiment, the whole payload of the layer 3 packet is encrypted.

According to one embodiment, when the layer 3 packet does not contain encrypted payload, steps 305, 306 and 307 do not exist.

At step 308, the layer 3 packet is decapsulated to retrieve a whole or part of a layer 2 packet.

When the complete layer 2 packet is decapsulated from one or more layer 3 packets, router 105 is then able to deliver the layer 2 packet at step 309.

According to one embodiment, the receiving router, such as router 105, does not consider the received layer 3 packets not authentic even the layer 3 packets, which belong to the same VPN tunnel, have different source addresses or destination addresses because the receiving router relies on tunnel association information to recognize authentic layer 3 packets. The situation happens when there are more than one network connections carrying layer 3 packets for a VPN tunnel. Under the same situation, prior arts consider some of the layer 3 packets are not authentic because the source addresses are different or the destination addresses are different.

System

FIG. 5 illustrates a network device implementing one of the embodiments of the present invention. A system is comprised of one or more first network interfaces 505 connecting to an internal network; one or more second network interfaces 506 connecting to one or more public and/or private networks; processing engine 501 and storage 507. First network interfaces 505 and second network interfaces 506 can be implemented by agents to be connected with optical fiber, cables, or antenna. Processing engine 501 can be implemented by using one or more central processing units, network processors, microprocessors, micro-controllers, FPGAs, ASICs or any device capable of performing instructions to perform the basic arithmetical, logical, and input/output operations of the system.

Encapsulation engine 502 is used to encapsulate a layer 2 packet into one or more layer 3 packets and put the protocol header in each layer 3 packet. Decapsulation engine 504 is used to decapsulate a layer 3 packet into a part or a complete layer 2 packet and retrieves the protocol header from the layer 3 packet. Encryption engine is used to encrypt and decrypt layer 2 packets and layer 3 packet. Those skilled in the art will appreciate that many different implementations to encapsulate, decapsulate, encrypt and decrypt packets suitable for practicing the present invention. The functions of encapsulation engine 502, protocol engine 503 and decapsulation engine 504 are carried by processing engine 501. Alternatively, the functions of encapsulation engine 502, protocol engine 503 and decapsulation engine 504 can be implemented by central processing units, network processors, microprocessors, micro-controllers, FPGAs, ASICs or any device capable of performing instructions to perform the basic arithmetical, logical, and input/output operations of the system.

Storage 507 can be implemented by using DRAM, SDRAM, Flash RAM, optical memory, magnetic memory, hard disk, and/or any other materials that are able to provide storage capability.

The network device connects to one or more local area networks through one or more first network interfaces 505. In a local area network, computing devices communicate with each other through layer 2 technology. The network device also connects to one or more wide area networks through one or more second network interfaces 506. At a wide area network, computing devices communicate with each other through layer 3 technology. The network device sets up one or more VPN tunnels with other network devices through one or more wide area networks by using one or more second network interfaces 506.

When a layer 2 packet is received at one of first network interfaces 505 and to be delivered to another local area network through a VPN tunnel, the layer 2 packet is encapsulated first in one or more layer 3 packets along with a protocol header by encapsulation engine 502, then is delivered to a wide area network through one or more second network interfaces 506. Protocol engine 503 is used to create the protocol header, which contains tunnel association information.

When a layer 3 packet, which contains a whole or a part of a layer 2 packet originated from another local area network, is received at one of second network interfaces 505 through a VPN tunnel and to be delivered to the local area network, a protocol header is retrieved from the layer 3 packet and then decapsulated to retrieve the whole or part of the layer 2 packet by using protocol engine 502 and decapsulation engine 504. If the layer 2 packet is fragmented into one or more layer 3 packets, the network device will not deliver the layer 2 packet to the local area network until the whole layer 2 packet is available. Protocol engine 503 is used to retrieve tunnel association information from the protocol header.

Storage 507 is used to provide instructions to processing engine 501, to provide temporary storage during encapsulation of a layer 2 packet into one or more layer 3 packets, and to provide temporary storage during decapsulation of one or more layer 3 packets into a layer 2 packet. According to one embodiment of the present invention, storage 507 is used to provide instructions directly to encapsulation engine 502, protocol engine 503 and decapsulation engine 507.

Those skilled in the art will appreciate that many different combinations of hardware will be suitable for practicing the present invention.

Alternative embodiments will become apparent to those skilled in the art to which the present invention pertains without departing from its spirit and scope. Accordingly, the scope of the present invention is defined by the appended claims rather than the foregoing description.

The invention claimed is:

1. A method for creating a protocol header for a virtual private network (VPN) tunnel at a network device, wherein the VPN tunnel is implemented using at least one network link, comprising:
   a. receiving layer two packets through at least one local area network (LAN) interface;
   b. determining a network link identification, wherein the network link identification is for identifying network links to which at least one layer three packet belongs;
   c. determining a tunnel sequence number, wherein the tunnel sequence number is for assisting a receiving network device to re-order the at least one layer three packet per VPN tunnel;
   d. determining a global sequence number, wherein the global sequence number is for arranging the at least one layer three packet to a correct sequence;
   e. creating a protocol header, wherein the protocol header comprises tunnel association information; wherein the tunnel association information comprises the network link identification, the tunnel sequence number and the global sequence number;

f. embedding the layer two packets in the at least one layer three packet along with the protocol header;

wherein the at least one layer three packet is sent through at least one wide area network;

wherein the protocol header is part of payload of the at least one layer three packets packet.

2. The method of claim 1, further comprising creating a timestamp indicator, wherein the protocol header further comprises the timestamp indicator.

3. The method of claim 1, further comprising creating an acknowledgement indicator, wherein the protocol header further comprises the acknowledgement indicator.

4. The method of claim 1, further comprising:
determining whether to encrypt the layer two packets; wherein the determining is performed according to predefined rules set manually or negotiated between the network device and another network device;
when determined to encrypt the layer two packet, storing the protocol header with encryption information; and
when determined to not encrypt the layer two packet, not storing the protocol header with encryption information.

5. The method of claim 4, further comprising encrypting the protocol header and not encrypting the encryption information stored in the protocol header.

6. The method of claim 1, wherein the protocol header is further stored with a version indicator, wherein the version indicator is for specifying version of VPN tunnel protocol used.

7. The method of claim 1, wherein the at least one layer three packet is sent using user datagram protocol.

8. The method of claim 1, wherein the protocol header is located next to the header of the at least one layer three packet.

9. The method of claim 1 further comprising encrypting at least one of the layer two packets before embedding the at least one layer two packet in the at lest one layer three packet.

10. The method of claim 1 wherein the protocol header is further stored with acknowledgement information.

11. A system for creating a protocol header for a virtual private network (VPN) tunnel at a network device, wherein the VPN tunnel is implemented using at least one network link, the link comprising:
at least one network interface;
at least one storage unit for storing program instructions to be executed;
at least one processing unit for executing program instructions stored in the
at least one storage unit for:
a. receiving layer two packets through at least one local area network (LAN) interface;
b. determining a network link identification, wherein the network link identification is for identifying network links to which at least one layer three packet belongs;
c. determining a tunnel sequence number, wherein the tunnel sequence number is for assisting a receiving network device to re-order the at least one layer three packet per VPN tunnel;
d. determining a global sequence number, wherein the global sequence number is for arranging the at least one layer three packet to a correct sequence;
e. creating a protocol header, wherein the protocol header comprises tunnel association information; wherein the tunnel association information comprises the network link identification, the tunnel sequence number and the global sequence number;
f. embedding the layer two packets in the at least one layer three packet along with the protocol header;
wherein the at least one layer three packet is sent through the at least one wide area network;
wherein the protocol header is part of payload of the at least one layer three packet.

12. The system of claim 11, wherein the at least one processing unit is further configured to create a timestamp indicator, wherein the protocol header further comprises the timestamp indicator.

13. The system of claim 11, wherein the at least one processing unit is further configured to create an acknowledgement indicator, wherein the protocol header further comprises the acknowledgement indicator.

14. The system of claim 11, wherein the at least one processing unit is further configured to:
determine whether to encrypt at least one of the layer two packets, wherein the determining is performed according to predefined rules set manually or negotiated between the network device and another network device;
when determined to encrypt the at least one of the layer two packets, storing the protocol header with encryption information; and
when determined to not encrypt the at least one of the layer two packets, not storing the protocol header with encryption information.

15. The system of claim 14, wherein the at least one processing unit is further operable for encrypting the protocol header and not encrypting the encryption information stored in the protocol header.

16. The system of claim 11, wherein the at least one storage unit stores a protocol header that is further stored with a version indicator, wherein the version indicator is for specifying the version of VPN tunnel protocol used.

17. The system for claim 11, wherein the at least one layer three packet is sent using user datagram protocol.

18. The system of claim 11, wherein the protocol header is located next to the header of the at least one layer three packet.

19. The system of claim 11, wherein the at least one processing unit is further operable for encrypting the at least one layer two packet before embedding the layer two packet in the at least one layer three packet.

20. The system of claim 11, wherein the at least one storage unit stores a protocol header that is further stored with acknowledgement information.

* * * * *